US011158932B2

(12) United States Patent
Peng et al.

(10) Patent No.: US 11,158,932 B2
(45) Date of Patent: Oct. 26, 2021

(54) FULL SCREEN ELECTRONIC DEVICE AND ANTENNA THEREOF

(71) Applicant: AAC Technologies Pte. Ltd., Singapore (SG)

(72) Inventors: Yongsheng Peng, Shenzhen (CN); Lei Zheng, Shenzhen (CN)

(73) Assignee: AAC Technologies Pte. Ltd., Singapore (SG)

(*) Notice: Subject to any disclaimer, the term of this patent is extended or adjusted under 35 U.S.C. 154(b) by 0 days.

(21) Appl. No.: 16/936,449

(22) Filed: Jul. 23, 2020

(65) Prior Publication Data
US 2020/0411956 A1    Dec. 31, 2020

Related U.S. Application Data

(63) Continuation of application No. PCT/CN2019/094070, filed on Jun. 30, 2019.

(51) Int. Cl.
*H01Q 1/24* (2006.01)
*H04M 1/02* (2006.01)

(52) U.S. Cl.
CPC .......... *H01Q 1/243* (2013.01); *H04M 1/0266* (2013.01)

(58) Field of Classification Search
CPC ............................ H01Q 1/243; H04M 1/0266
See application file for complete search history.

(56) References Cited

U.S. PATENT DOCUMENTS

| 10,631,420 | B1* | 4/2020 | Xiong | ................. H05K 5/0017 |
| 2011/0032157 | A1* | 2/2011 | Suh | ........................ H01Q 5/371 |
| | | | | 343/702 |
| 2017/0068383 | A1* | 3/2017 | Chern | ................. G06F 3/04166 |
| 2017/0142241 | A1* | 5/2017 | Kim | ........................ H01Q 5/385 |
| 2018/0123234 | A1* | 5/2018 | Wang | ........................ H01Q 9/42 |
| 2018/0331416 | A1* | 11/2018 | Yu | ............................ H01Q 9/42 |
| 2019/0006740 | A1* | 1/2019 | Kuang | .................. H01Q 13/10 |
| 2019/0070760 | A1* | 3/2019 | Huang | ................ H04M 1/0202 |
| 2019/0229429 | A1* | 7/2019 | Wu | ........................ H01Q 1/243 |
| 2020/0076080 | A1* | 3/2020 | Liu | ........................ H01Q 5/50 |
| 2020/0321688 | A1* | 10/2020 | Khripkov | ............... H01Q 1/243 |
| 2020/0412412 | A1* | 12/2020 | Su | ............................ H01Q 1/38 |

* cited by examiner

Primary Examiner — Lewis G West
(74) Attorney, Agent, or Firm — W&G Law Group

(57) ABSTRACT

The present invention discloses an antenna including a frame body and a circuit board arranged in the frame body. The frame body includes a middle frame and an outer metal frame surrounding the edge of the middle frame and connected to the middle frame. The outer metal frame includes a first side frame, a second side frame, a third side frame and a fourth side frame. The circuit board is provided with a feeding part and a switch circuit which are electrically connected with the third side frame. The third side frame and the middle frame are arranged at an interval to form a first gap; a second gap is arranged between one end of the second side frame near the third side frame and the middle frame. BY virtue of this configuration the radiation efficiency of the antenna is accordingly improved.

7 Claims, 3 Drawing Sheets

FULL SCREEN ELECTRONIC DEVICE AND ANTENNA THEREOF

FIELD OF THE PRESENT DISCLOSURE

The present application relates to the field of communication technologies, and in particular to a full screen electronic device and an antenna used in the full screen electronic device.

DESCRIPTION OF RELATED ART

With the development of electronic communication technology, mobile terminals such as mobile phones and tablet computers are becoming more and more popular. Existing mobile terminals use metal side frames as antennas by opening slits in the metal side frames of the mobile terminals. With the popularization of a full screen electronic device, the requirements on the radiation efficiency of antennas are getting higher and higher.

Therefore, it is necessary to provide an improved antenna applied to a full screen electronic device to improve the radiation efficiency of the antenna.

SUMMARY OF THE PRESENT INVENTION

One of the main objects of the present invention is to provide an antenna with improved radiation efficiency.

Accordingly, the present invention discloses an antenna including a frame body and a circuit board arranged in the frame body. The frame body includes a middle frame and an outer metal frame surrounding the edge of the middle frame and connected to the middle frame. The outer metal frame includes a first side frame, a second side frame, a third side frame and a fourth side frame. The circuit board is provided with a feeding part and a switch circuit which are electrically connected with the third side frame. The third side frame and the middle frame are arranged at an interval to form a first gap; a second gap is arranged between one end of the second side frame near the third side frame and the middle frame.

BY virtue of this configuration the radiation efficiency of the antenna is accordingly improved.

In addition, a width of the second gap is greater than or equal to 1 mm.

In addition, one end of the third side frame near the second side frame includes a first circulation part; and one end of the third side frame near the fourth side frame includes a second circulation part.

In addition, the first circulation part and the second circulation part are both openings in the third side frame.

In addition, the circuit board further includes a grounding part; and the antenna further comprises an LDS antenna arranged in the frame body and electrically connected with the feeding part and the grounding part respectively.

In addition, the antenna further comprises a plastic filler filled in the first gap and the second gap.

The invention further provides a full screen electronic device, comprising an antenna as described above.

BRIEF DESCRIPTION OF THE DRAWINGS

Many aspects of the exemplary embodiments can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENTS

Figure 1:
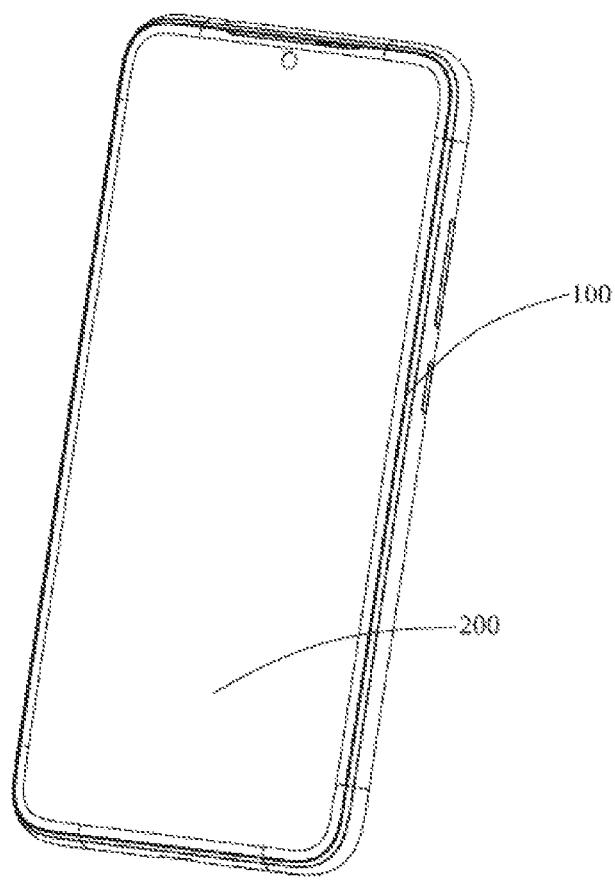
FIG. 1 is an isometric view of full screen electronic device in accordance with an embodiment of the present invention.

The present disclosure will hereinafter be described in detail with reference to several exemplary embodiments. To make the technical problems to be solved, technical solutions and beneficial effects of the present disclosure more apparent, the present disclosure is described in further detail together with the figure and the embodiments. It should be understood the specific embodiments described hereby is only to explain the disclosure, not intended to limit the disclosure.

It should be noted that all directional indicators (such as upper, lower, left, right, front, rear, top, bottom, etc.) in the embodiment of the present application are only used to explain the relative positional relationship between various components under a certain posture (as shown in the drawings), etc. If the specific posture changes, the directional indicator will also change accordingly.

It should also be noted that when an element is referred to as being "fixed" or "disposed" on another element, the element may be directly on the other element or there may be intervening elements at the same time. When an element is called "connected" to another element, it may be directly connected to the other element or there may be intervening elements at the same time.

As shown in FIG. 1, a full screen electronic in accordance with an embodiment of the present invention can be a mobile phone or a tablet computer. The full screen electronic device comprises an antenna 100 and a cover 200 installed in cooperation with the antenna 100.

Figure 2:
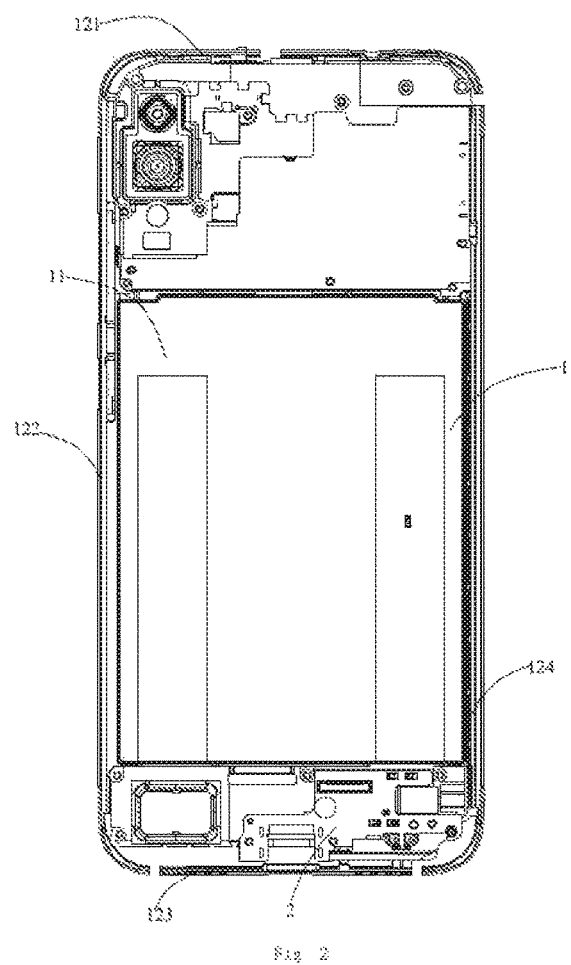
FIG. 2 is an illustration view of an antenna used in the full screen electronic device in FIG. 1.
Figure 3:
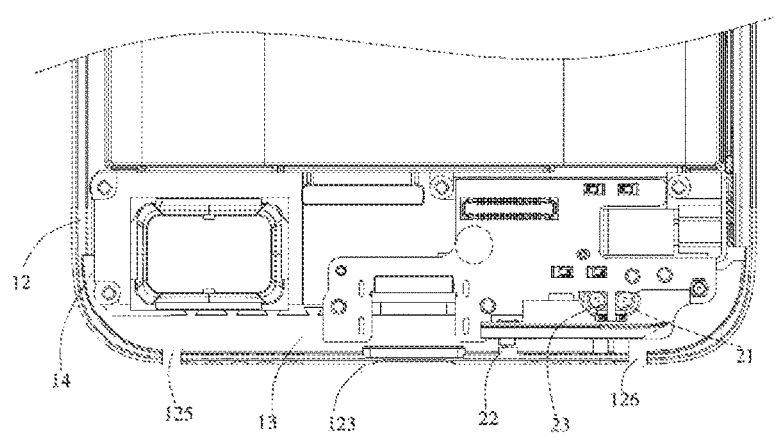
FIG. 3 is a partially enlarged view of the antenna in FIG. 2.

As shown in FIGS. 2-3, the antenna 100 comprises a frame body 1 and a circuit board 2 arranged in the frame body 1, wherein the frame body 1 comprises a middle frame 11 and an outer metal frame 12 surrounding the edge of the middle frame 11 and connected to middle frame 11. The outer metal frame 12 comprises a first side frame 121, a second side frame 122, a third side frame 123 and a fourth side frame 124. The first side frame 121 and the third side frame 123 are oppositely arranged. The second side frame 122 and the fourth side frame 124 are oppositely arranged. The circuit board 2 is provided with a feeding part 21 and a switch circuit 22 which are electrically connected with the third side frame 123. The third side frame 123 and the middle frame 11 are arranged at an interval to form a first gap 13. A second gap 14 is arranged between one end of the second side frame 122 near the third side frame 123 and the middle frame 11. The first gap 13 is communicated with the second gap 14. The radiation efficiency of the antenna is improved by providing the second gap 14 formed between one end of the second side frame 122 near the third side frame 123 and middle frame 11.

Preferably, a width of the first gap 13 is 2.2 mm, a the width of the second gap 14 is greater than or equal to 1 mm. The width of the first gap 13 is the distance between the third side frame 123 and the middle frame 11, the width of the second gap 14 is the distance between the second side frame 122 and the middle frame 11, and the radiation efficiency of the antenna increases with the increase of the width of the second gap 14.

In one embodiment, one end of the third side frame 123 near the second side frame 122 is provided with a first circulation part 125, and one end of the third side frame 123 near the fourth side frame 124 is provided with a second circulation part 126. Preferably, the first circulation part 125 and the second circulation part 126 are both openings in the third side frame 123. It is understood that the first circulation part 125 and the second circulation part 126 may also be insulating spacers.

In addition, the circuit board 2 further includes a grounding part 23, and the antenna 100 further comprises an LDS antenna 3 which is arranged in the frame body 1 and electrically connected with the feeding part 21 and the grounding part 23 respectively. The LDS antenna 3 is an antenna formed by plating through laser technology. The feeding part 21 and the switch circuit 22 can be connected with the third side frame 123 through elastic sheets or other conductive materials.

Figure 4:
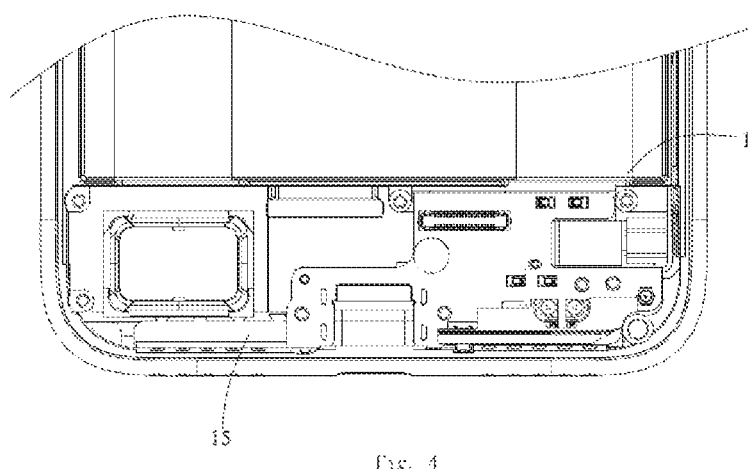
FIG. 4 is an illustrative view of an antenna in accordance with another embodiment of the present invention.

As shown in FIG. 4, the antenna 100 provided by another embodiment of the present invention further comprises a plastic filler 15 filled in the first gap 13 and the second gap 14, thereby preventing dust from entering the first gap 13 and the second gap 14 to affect the performance of full screen electronic device.

Figure 5:
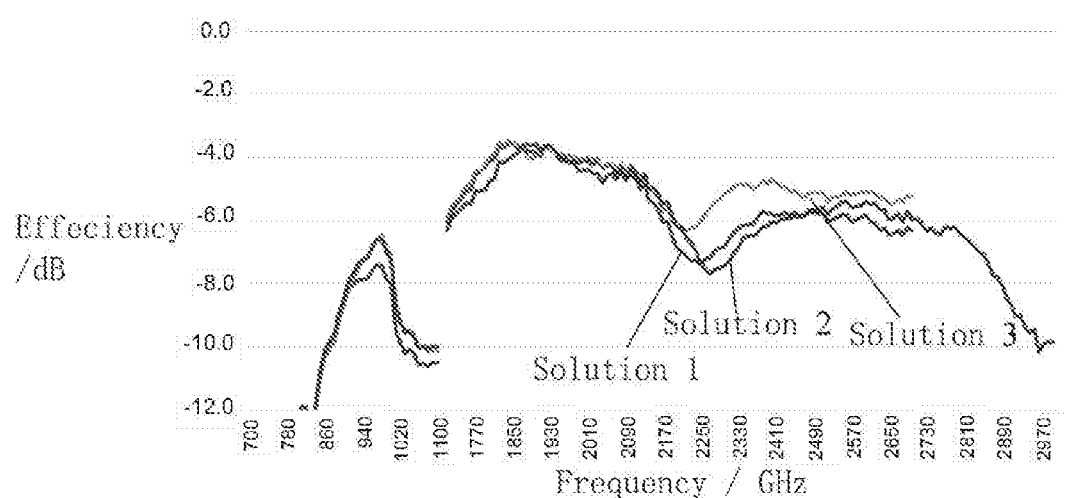
FIG. 5 is an efficiency view of the antenna of the present invention.

A curve corresponding to Solution 3 in FIG. 5 is an efficiency diagram of the antenna of the full screen electronic device provided by the embodiment of the present invention. Solution 1 and Solution 2 are both solutions without the second gap 14. It can be seen that the efficiency of the full screen electronic device provided by the embodiment of the present invention is higher than those of solutions 1 and 2.

The full screen electronic device and the antenna thereof provided by the present invention are fed by electrically connecting the third side frame 123 of the outer metal frame 12 with the circuit board 2. The first gap 13 is formed at the interval between the third side frame 123 and the middle frame 11, while the second gap 14 is formed between one end of the second side frame 122 near the third side frame 123 and the middle frame 11. The first gap 13 is communicated with the second gap 14, thereby improving the radiation efficiency of the antenna 100.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. An antenna, comprising:
a frame body having
a middle frame;
an outer metal frame surrounding an edge of the middle frame and connected with the middle frame; the outer metal frame comprising a first side frame, a second side frame, a third side frame opposite to the first side frame, and a fourth side frame opposite to the second side frame, which are connected end to end;
a circuit board arranged in the frame body, including a feeding part and a switch circuit electrically connected with the third side frame;
a first gap formed between the third side frame and the middle frame;
a second gap formed between one end of the second side frame near the third side frame and the middle frame; wherein
the first gap is communicated with the second gap.

2. The antenna as described in claim 1, wherein a width of the second gap is greater than or equal to 1 mm.

3. The antenna as described in claim 1, wherein one end of the third side frame near the second side frame includes a first circulation part; and one end of the third side frame near the fourth side frame includes a second circulation part.

4. The antenna as described in claim 3, wherein the first circulation part and the second circulation part are both openings in the third side frame.

5. The antenna as described in claim 1, wherein the circuit board further includes a grounding part; and the antenna further comprises an LDS antenna arranged in the frame body and electrically connected with the feeding part and the grounding part respectively.

6. The antenna as described in claim 1 further comprising a plastic filler filled in the first gap and the second gap.

7. A full screen electronic device, comprising an antenna as described in claim 1.

* * * * *